United States Patent [19]
Uchidoi et al.

[11] 3,938,886
[45] Feb. 17, 1976

[54] SLIDE PROJECTOR CONTROLLABLE OF ITS PROJECTION TIME

[75] Inventors: Masanori Uchidoi, Kawasaki; Tateo Yamada, Tokyo, both of Japan

[73] Assignee: Canon Kabushiki Kaisha, Tokyo, Japan

[22] Filed: Nov. 5, 1973

[21] Appl. No.: 412,837

[30] Foreign Application Priority Data
Nov. 11, 1972 Japan.................. 47-129976[U]

[52] U.S. Cl.................. 353/115; 353/116; 353/103
[51] Int. Cl.².......................................... G03B 23/04
[58] Field of Search.................... 353/115, 103–114, 353/116–118

[56] References Cited
UNITED STATES PATENTS
3,115,811 12/1963 Mulch................................ 353/115
3,632,199 1/1972 Peterson.............................. 353/103

*Primary Examiner*—Richard E. Aegerter
*Assistant Examiner*—Larry Jones
*Attorney, Agent, or Firm*—William R. Woodward

[57] ABSTRACT

In a slide projector a plurality of slide films contained in a tray are successively selected and shifted to a projected position. A switch is provided which controls movement through a clutch to a running motor of each slide film between its tray-stored position and its projection position and also movement of the tray itself. This switch serves also as a switch for resetting a timer which holds each slide film in its projected position for any desired time.

20 Claims, 5 Drawing Figures

SLIDE PROJECTOR CONTROLLABLE OF ITS PROJECTION TIME

BACKGROUND OF THE INVENTION

1. Field of the Invention

This invention relates to a slide projector with automatically controllable projection, time and more particularly to a slide projector which has a control device for variably setting the projection time when a plurality of slide films contained in a tray are successively selected for projection.

1. Description of the Prior Art

In the conventional slide projectors, variation of the slide film projection time has been accomplished by transmitting the drive of a drive motor for vertically moving each slide film and for horizontally moving a tray to a mechanical timer mechanism, which in turn holds the slide film in its projected position for a set period of time. The use of such mechanical timer mechanism has led to the larger size and higher cost of the projector device. Further, since the timer mechanism utilized the revolutions of the drive motor, the motor had to be rotated at all times and this caused overheating of the motor which could adversely affect not only the motor but also adjacent portions.

SUMMARY OF THE INVENTION

It is an object of the present invention to provide a slide projector which eliminates the above-noted disadvantages peculiar to the prior art and which has a slide film projection time control device permitting a compact size of the device and highly accurate control of the projection time.

It is another object of the present invention to provide in a slide projector which permits a plurality of slide films contained in a tray to be successively selected and projected, a projection time control device in which means for controlling vertical movement of the slide films and horizontal movement of the tray serves also as reset switch means in a timer circuit for holding each slide film in its projected position for a set period of time, thereby making the slide projector compact and econmical as well as highly accurate in operation.

Other objects and features of the present invention will become fully apparent from the following detailed description taken in conjunction with the accompanying drawings.

DESCRIPTION OF THE PREFERRED EMBODIMENTS

Figure 1:
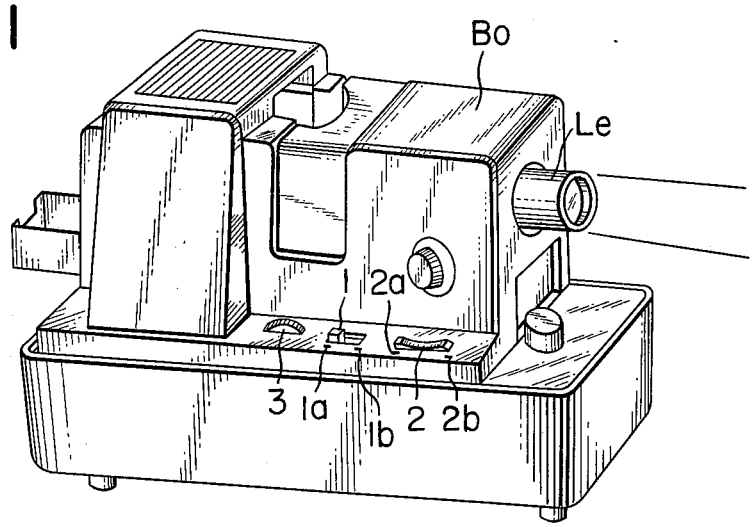
FIG. 1 is a pictorial, perspective view of the slide projector according to an embodiment of the present invention.

Referring to FIG. 1, there is shown a pictorial view of the slide projector according to an embodiment of the present invention which comprises a slide projector body Bo having a lens Le attached thereto in a well-known manner. The slide projector includes a tray removal switch 1 having a projection contact 1a and a tray removal contact 1b. It further includes a switch 2 having contacts 2a and 2b for permitting movement of the tray to be changed over between the forward and the backward direction. A timer switch 3 is provided to hold a slide film in its projected position for a set period of time.

Figure 2:
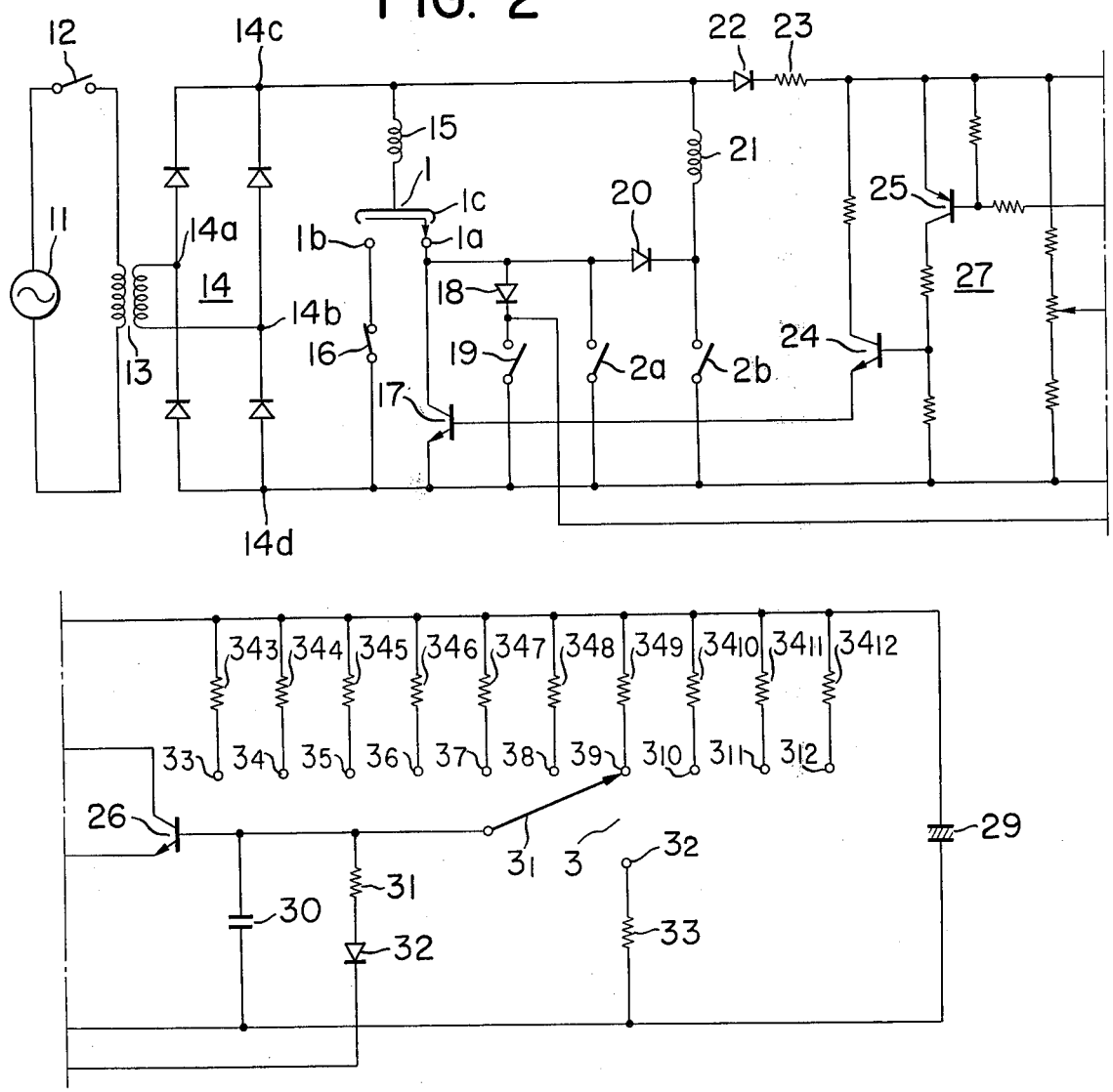
FIG. 2 diagrammatically shows an example of the electric circuit applicable to the slide projector of the present invention.

FIG. 2 diagrammatically shows a projection time control circuit in which numerals 1, 2 and 3 designate the respective switches described above in connection with FIG. 1. An AC power source 11 is connected through a main switch 12 and a transformer 13 to the input terminals 14a and 14b of a rectifier circuit 14 comprising four diodes. The rectifier circuit 14 has an output terminal 14c connected through a first plunger solenoid 15 to the movable contact 1c of the aforesaid tray removal switch 1. The tray contact 1b of the switch 1 is connected through a first switch 16 to another output terminal 14d of the rectifier circuit 14. The projection contact 1a of the switch 1 is connected through a forward diode 18 and a second switch 19 to the output terminal 14d of the rectifier circuit 14. Further, the projection contact 1a of the switch 1 is connected through the forward movement contact 2a of the aforesaid switch 2 to the output terminal 14d of the rectifier circuit 14. In addition, the projection contact 1a of the switch 1 is connected through a forward diode 20 to the juction between a second plunger 21 and the backward movement contact 2b of the switch 2. The second plunger 21 and the backward movement contact 2b are connected together between the output terminals 14c and 14d respectively, of the rectifier circuit 14. Also between these output terminals 14c and 14d there are parallel-connected a transistor circuit 27, a timer circuit and a capacitor 29, the transistor circuit 27 comprising first to fourth transistors 17, 24, 25 and 26. The timer circuit 28 inculdes therein the aforesaid timer switch 3. The movable contact $3_1$ of the timer switch 3 is, on the one hand, connected to the base of the fourth transistor 26 and on the other hand, connected through a capacitor 30 to the output terminal 14d of the rectifier circuit 14.

Further, the movable contact $3_1$ is connected through a resistor 31 and a forward diode 32 to the junction between the diode 18 and the second switch 19, thus constituting a discharge circuit for the capacitor 30. A fixed contact $3_2$ of the timer switch 3 is connected through a resistor 33 to the output terminal 14d of the rectifier circuit 14, and further fixed contacts $3_3, 3_4, 3_5, 3_6, 3_7, 3_8, 3_9, 3_{10}, 3_{11}$ and $3_{12}$ are respectively connected through resistors $34_3, 34_4, 34_5, 34_6, 34_7, 34_8, 34_9, 34_{10}, 34_{11}$ and $34_{12}$ to the positive potential side. These resistors $34_3, 34_4, 34_5, 34_6, 34_7, 34_8, 34_9, 34_{10}, 34_{11}$ and $34_{12}$ are respectively set to cooperate with the capacitor 30 to turn on the fourth transistor 26, for example, after two, four, six, eight, ten, twenty, thirty, forty, fifty and sixty seconds. The transistor circuit 27 is designed so that when the transistor 26 is turned on the transistor circuit 27 turns on the third and second transistors 25 and 24 and then turns on the first transistor 17.

Figure 3:
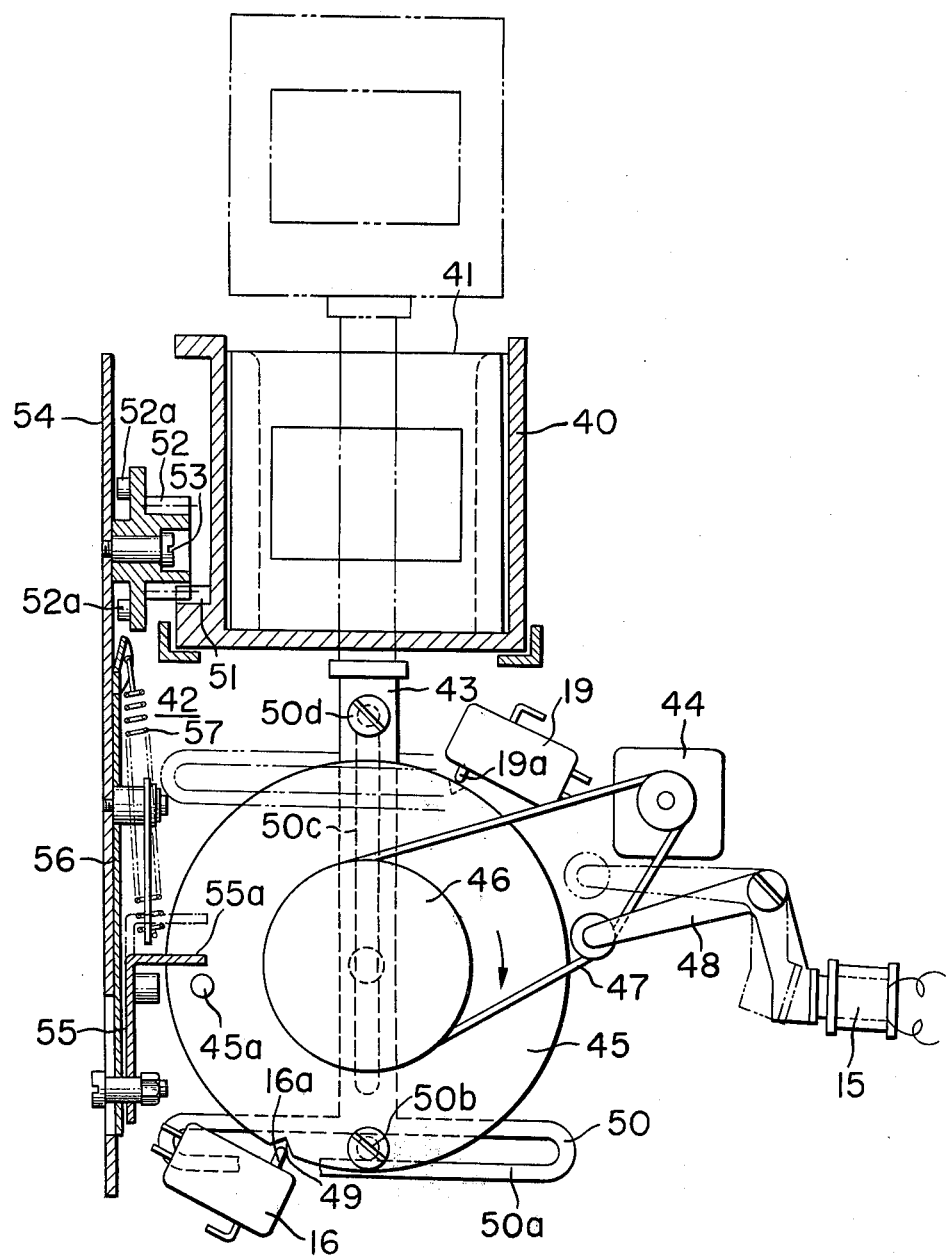
FIG. 3 is a front view showing a form of the mechanism applicable to the present invention for effecting the driving of the slide film and movement of such film to its projected position.
Figure 4:
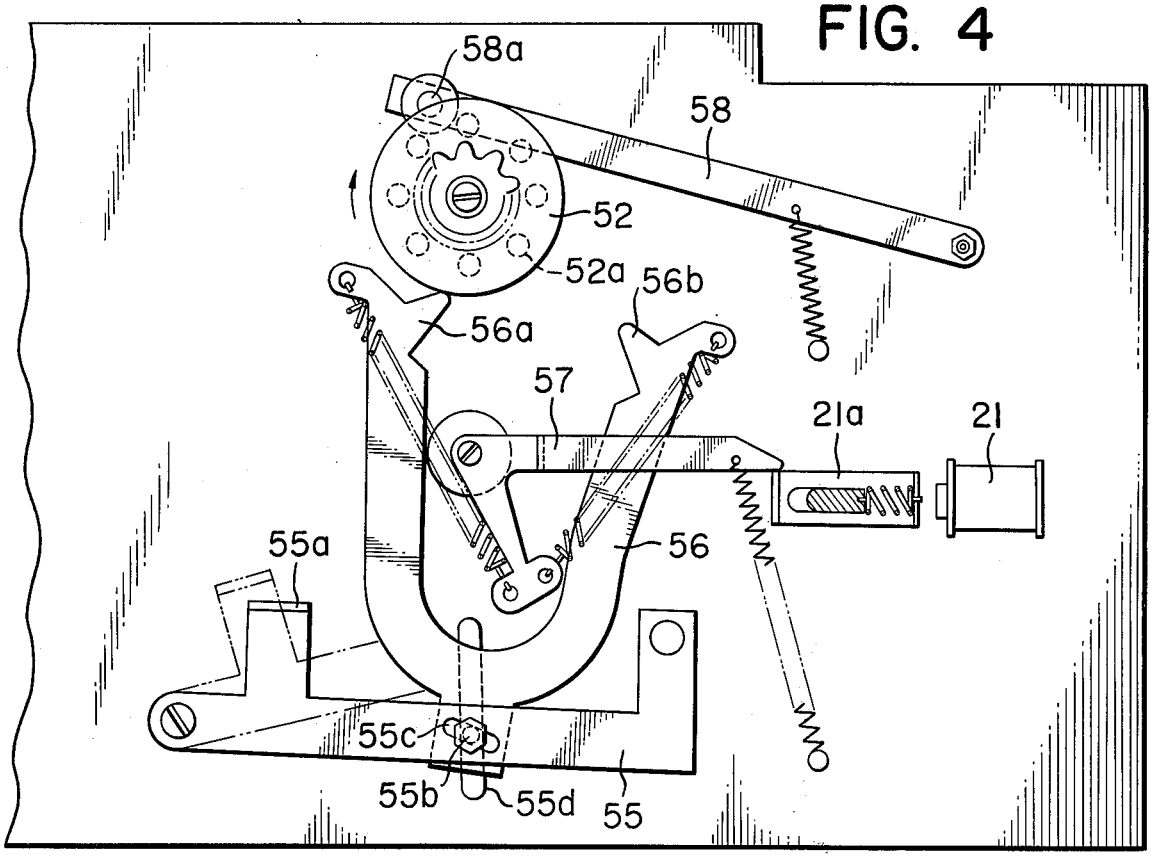
FIG. 4 is a side view showing the mechanism of FIG. 3 in its position for moving a slide film storage tray forwardly.
Figure 5:
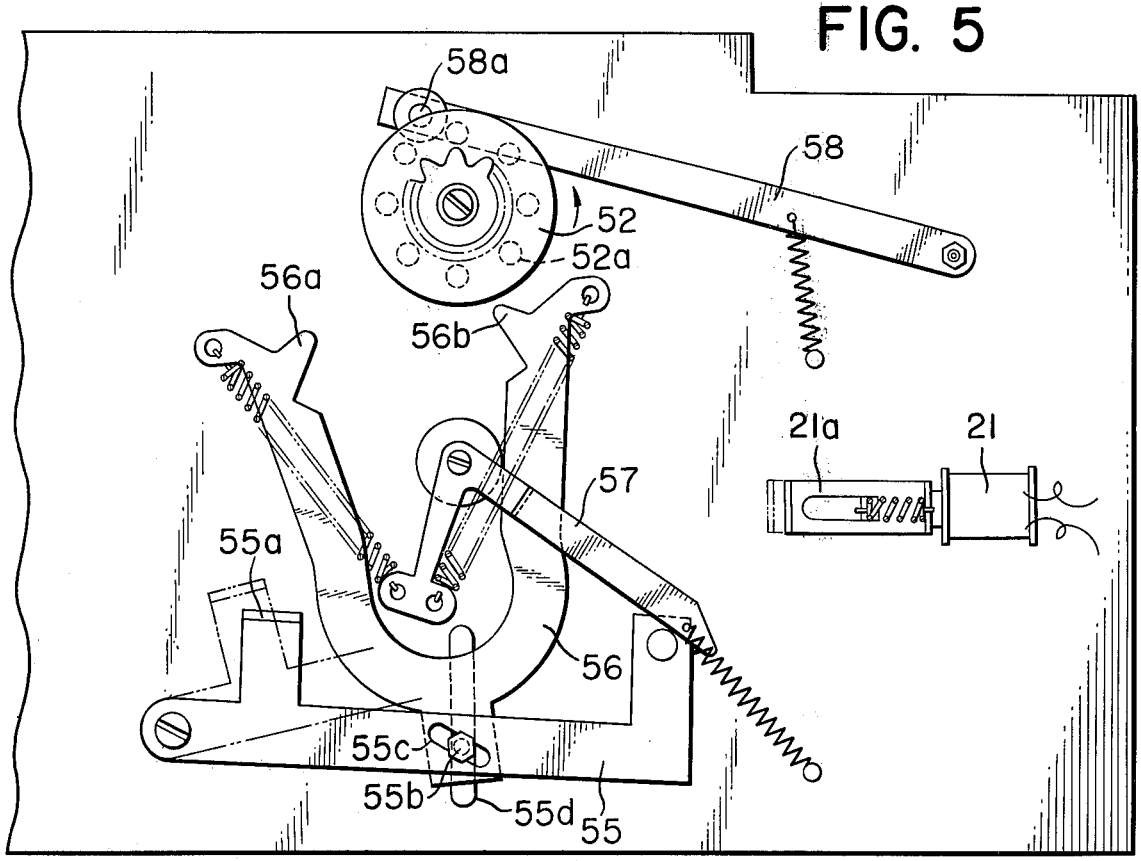
FIG. 5 is a view similar to FIG. 4 but showing the mechanism in its position for moving the slide film storage tray backwardly.

FIG. 3 shows a drive mechanism in which numerals 15, 16 and 19 designate the first solenoid plunger, the first switch and the second switch shown in FIG. 2. Numeral 40 denotes a tray containing therein a plurality of slide films 41 and this tray 40 is provided with a tray moving mechanism 42 and a slide vertically moving mechanism 43 for shifting each slide film 41 to its projected position (the position as indicated by dots-and-dash lines in FIG. 3). Numeral 44 designates a drive motor which is drivingly connected to a disc 45 by a belt 47 wrapped around the output shaft of the drive motor and around a pulley 46 rotatably secured to the disc. The belt 47 is provided with a tension adjusting mechanism 48. The tension adjusting mechanism 48 is actuated by the aforesaid first solenoid plunger 15 in such a manner that upon energization of the first solenoid plunger 15 the tension adjusting mechanism tightens the belt 47 to transmit the drive from the motor 44 to the pulley 46 which in turn rotates the disc 45 clockwisely as viewed in FIG. 3 and that upon deenergization of the first plunger solenoid 15 the tension adjusting mechanism loosens the belt 47 so as not to transmit the drive of the motor 44 to the pulley 46. The disc 45 has a notch 49 formed in the periphery thereof, and around the disc 45 there are first and second switches 16 and 19 disposed with a phase difference of 180° so that these switches 16 and 19 are opened when their contacts 16a and 19a are engaged with the notch 49. The slide vertically moving mechanism 43 is connected to the disc 45 and has an operating rod 50 for converting the rotational movement of the disc 45 into a linear movement to thereby effect vertical movement of a slide film 41 between its stored position in the tray 40 and the projected position indicated by the dots-and-dash lines. The operating rod 50 is formed with a first elongated slot 50a which is engaged by a pin 50b studded in the disc 45. The rod 50 is also formed with a second elongated slot 50c perpendicular to the first elongated slot 50a and engaged by a pin 50d secured to the projector body, thereby guiding the vertically moving mechanism 43 vertically as viewed in FIG. 3. The disc 45 is provided with a projection 45a adapted to actuate the tray moving mechanism 42 during rotation of the disc 45. The tray moving mechanism 42 is designed as will be described hereinafter with reference to FIGS. 3 to 5. The tray 40 has a rack 51 provided on one side thereof and meshing with a circular pinion 52 which moves the tray 40. The pinion 52 rotatably mounted on a base plate 54 by means of a screw 53. On the pinion 52, there are provided a predetermined number of projections 52a arranged like a circle concentric with the center of the pinion 52. A transmission plate 55 has one end thereof pivotally supported on the base plate 54, and is provided with a projected member 55a which is adapted to be raised by the projection 45a of the disc 45 to thereby raise the transmission plate 55. A U-shaped feed rod 56 having pawls 56a and 56b at the two ends thereof is mounted to the transmission plate 55 for pivotal movement by means of the pin-slot engagement between the pin 55b and the slot 55c and for movement along an elongated slot 55d formed in the projector body. The feed rod 56 is provided with its positioning mechanism 57 controlled by the second solenoid plunger 21 in the manner as shown in FIGS. 4 and 5. The positioning mechanism 57 is set so that during non-energization of the second solenoid plunger 21 it is engaged with an actuator member 21a to tilt the feed rod 56 rightwardly as viewed in FIG. 4. When the transmission plate 55 is then raised, the feed rod 56 is also raised in unison therewith to bring one pawl 56a thereof into engagement with a projection 52a on the pinion 52 thereby rotate the pinion 52 clockwisely as viewed in the figure. When the solenoid plunger 21 is energized, the actuator member 21a is attracted to the plunger 21 so that the positioning mechanism 57 is brought out of engagement with the actuator member 21a to thereby tilt the feed rod 56 leftwardly as shown in FIG. 5. When the transmission plate 55 is then raised, the feed rod 56 is also raised in unison therewith along the elongated slot 55d to bring the other pawl 56b thereof into engagement with a projection 52a on the pinion 52, thus rotating the pinion counter-clockwisely. A lever 58 having a roller 58a is provided and designed to that when the tray moves to a position suitable for a slide film 41 to be raised, the roller 58a is received between two adjacent projections 52a of the pinion 52 by an unshown conventional mechanism to thereby maintain the tray 40 in that position.

Operation of the described arrangement will now be described on the assumption that the position in which a slide film 41 is raised for projection as indicated by dots-and-dash lines in FIG. 3 is the initial position. The second switch 19 is then opened with its contact 19a engaged in the notch 49 of the disc 45. The projection contact 1a of the tray removal switch 1 is closed, the movable contact $3_1$ of the timer switch 3 is closed with respect, for example, to the fixed contact $3_3$ (the projection time for the slide 41 is two seconds), and the main switch 12 is closed, whereby the capacitor 30 is charged through the resistor $34_3$ until the voltage across the capacitor reaches a predetermined level after a period of time determined by the time constant of the capacitor 30 and resistor $34_3$ (in the present case, two seconds). At this moment, the fourth transistor 26 is turned on to turn on the third and second transistors 25 and 24, and then turn on the first transistor 17. As a result, there is completed a closed circuit comprising the power source, the first plunger solenoid 15, the projection contact 1a and the first transistor 17, so that the first solenoid plunger 15 is electrically energized. This in turn drives the belt tension adjusting mechanism 48 to permit the drive of the motor 44 to be transmitted through the belt and pulley 46 to the disc 45. Thus, the disc 45 begins to rotate clockwise to bring its notch 49 out of engagement with the contact 19a of the second switch 19 while, at the same time the rotating disc 45 causes the operating rod 50 to move the slide film 41 down from its projected position. Such disengagement occurring between the contact 19a of the second switch 19 and the notch 49 of the disc 45 results in closing of the second switch 19. As a result, there is formed a discharge circuit for the capacitor 30, which now begins discharging while, at the same time, there is formed a closed circuit comprising the power source, the first plunger solenoid 15, the projection contact 1a, the diode 18 and the second switch 19. Since the first plunger solenoid is thus maintained energized, the transmission of the drive from the motor 44 to the disc 45 can continue. Thus, the slide film 41 is continuedly moved down until it is fully received in the tray 40.

Then, the projection 45a of the disc 45 is engaged with the projecting member 55a to raise the transmission plate 55, so that the feed rod 56 is also raised in union therewith along the elongated slot 55d. As a result, the pawl 56a of the feed rod 56 is brought into engagement with the projection 52a of the pinion 52, which is thus rotated clockwise. This causes the slide film tray 40 to be moved forwardly by an amount corresponding to one frame, whereupon the slide film tray is maintained in that position by the roller 58a of the lever 58 being received between two adjacent projections 52a of the pinion 52 to hold the pinion 52 immovably. Then, disengagement occurs between the projection 45a of the disc 45 and the projected member 55a of the transmission plate 55. This disengagement permits the operating rod 50 to raise a slide film 41 up to its projected position, whereupon the notch 49 of the disc 45 is engaged by the contact 19a of the second switch 19, which is thus opened. This prevents the formation of the closed circuit comprising the power source, the first plunger solenoid 15, the projection contact 1a, the diode 18 and the second switch 19, so that the first plunger solenoid 15 is deenergized to stop the disc 45 from rotating, thus completing a cycle of operation. A second cycle of operation may be initiated when the capacitor 30 begins to be charged through the resistor $34_3$. By repetition of such operation, a slide film 41 may be projected for a set period of time (say, two seconds). The projection time of the slide film 41 can be varied by changing over the movable contact $3_1$ of the timer switch 3 to any desired one of the other fixed contacts $3_4, 3_5, 3_6, 3_7, 3_8, 3_9, 3_{10}, 3_{11}, 3_{12}$.

Where it is desired to move the tray 40 forwardly and project a slide film 41 without using the timer circuit 28, the movable contact $3_1$ of the timer switch 3 is changed over to the fixed contact $3_2$ and the forward movement contact 2a is closed, whereby a closed circuit comprising the power source 1, the first plunger solenoid 15, the projection contact 1a and the forward movement contact 2a is first formed to permit occurrence of the same operation as that described above, thus returning the slide film 41 to its projected position. The slide film 41 is projected for any desired period of time, whereafter the forward movement contact 2a may be closed to repeat the described operation.

Where it is desired to move the tray 40 backwardly and project a slide film 41 without using the timer circuit 28, the movable contact $3_1$ of the timer switch 3 is changed over to the fixed contact $3_2$ and the backward movement contact 2b is closed, whereby a closed circuit comprising the power source, the first solenoid plunger 15, the projection contact 1a, the diode 20 and the backward movement contact 2b and a closed circuit comprising the power source, the second plunger solenoid 21 and the backward movement contact 2b are first formed to effect the same operation as described above. In this case, however, the second plunger solenoid 21 is energized and therefore, the feed rod 56 is tilted leftwardly, as shown in FIG. 5, by the positioning mechanism 57, so that the pinion 52 is rotated counter-clockwisely by the pawl 56b to move the tray 41 backwardly.

The slide film 41 is returned to its projected position and projected for any desired period of time, and then the backward movement switch 2b is again closed, whereby the same operation as described is repeated.

To remove the tray 40, the tray removal switch 1 may be changed over to the removal contact 1b to form a closed circuit comprising the power source, the first plunger solenoid plunger 15, the removal contact 1b and the first switch 16, thus electrically energizing the first plunger solenoid 15. As a result, the tension adjusting mechanism tightens the belt to permit transmission of the drive from the motor 44 to the disc 45, which is thus rotated to move down the slide film 41 from its projected position into its fully received position in the tray 40. Thereupon, engagement occurs between the contact 16a of the first switch 16 and the notch 49 of the disc 45, thus closing the first switch 16. As a result, the first plunger solenoid 15 is deenergized to stop the disc 45 from rotating. This makes the tray 40 ready for removal.

To replace the tray 40 and return the slide film 41 to its projected or initial position, the removal switch 1 may be changed over to the projection contact 1a and this, together with the then closed second switch 19, forms a closed circuit comprising the power source, the first plunger solenoid 15, the projection contact 1a, the diode 18 and the second switch 19. As a result, the first plunger 15 is electrically energized to actuate the tension adjusting mechanism 48 to permit transmission of the drive from the motor 15 to the disc 45. Thus, the disc 45 is rotated to move the tray forwardly by an amount corresponding to one frame, and then raise the slide film 41 up to its projected position. Thereupon, the second switch 19 is opened with its contact 19a engaged in the notch 49 of the disc 45. This deenergizes the first plunger solenoid 15, which in turn stops the disc 45 to maintain the slide film 41 in its raised or projected position.

According to the present invention, as has been described in detail hereinbefore, there is provided, in a projector which permits a plurality of slide films contained in a tray to be successively selected and projected, a projection time control device in which switch means for controlling vertical movement of the slide films and horizontal movement of the tray serves also as reset switch means in a timer circuit for holding each slide film in its projected position for a set period of time. Such projection time control device may be made compact and economical since it eliminates the use of any mechanical timer mechanism which has heretofore been required. Moreover, since the drive of the drive motor is transmitted to the slide vertically moving mechanism only when required, the control device can be highly accurate in operation, eliminating any variation in the speed of revolution which would otherwise result from the stoppage or start of the motor.

We claim:
1. A slide film projector, comprising in combination:
   a. slide film supporting means for supporting a plurality of slides while supporting one of said slides in a ready position;
   b. slide film moving means for causing a slide film to move between said ready position and a projection position;
   c. means for driving said slide film moving means including a motor arranged for running without interruption in between a plurality of successive operations of said slide film moving means;
   d. means for programming movement of said slide film moving means, including:
      1. slide film movement control means including a selectively connectable and disconnectable driving connection with said driving means, for causing said slide film moving means to operate sequentially in a predetermined cycle by receiving driving force from said driving means through said driving connection;

2. switching means, operatively connected with said control means, for disconnecting the driving connection of said control means with said driving means when a slide film is positioned at said projection position by said slide film moving means, and for maintaining the driving connection therebetween when no slide film is in said projection position; and 3. timer switch means, operatively connected to both said switching means and said control means, for governing the projection time of said slide film, said timer switch means being provided with selective setting means for setting a particular projection time for said slide film and having time measuring means responsive to said switching means for restoring the driving connection between said control means and said driving means upon lapse of the time set by said setting means, said timer switch means further having means for resetting said time measuring means to a beginning state in response to said switching means when said slide film is caused to shift from said projection position to said ready position by said slide film moving means, and e. means for shifting said slide film support means, between cycles of said slide film moving means, so as to bring different slides successively into said ready position.

2. A slide film projector as claimed in claim 1 wherein said control means includes:

a. an operation control member for sequentially operating said slide film moving means in a predetermined cycle by receiving driving force from said driving means when said driving connection is connected; and b. means for selectively connecting and disconnecting said operation control member respectively with and from said driving means in response respectively to first and second states of said selective connection means said selective connecting means being arranged in electric circuit so as to be changed over from said first state to said second state under control of said switching means, and from said second state to said first state under control of said timer switch means.

3. A slide film projector as claimed in claim 2 wherein said selective connecting means includes:

a. a connecting member for operatively connecting said driving means with said operation control member; and b. change-over means for acting on said connecting member to connect and disconnect the operative connection between said driving means and said operation control member by said connecting member in response respectively to first and second states of said change-over means, said change-over means being connected to said switching means so as to change over from said first state to said second state under control by said switching means, and being connected to said timer switch means so as to change over from said second state to said first state under control of said timer switch means.

4. A slide film projector as claimed in claim 1 wherein said control means includes:

a. a rotary disc for translating rotary movements to reciprocating movement and having a belt-receiving surface for receiving rotary movements from said driving means;

b. a belt passing around said belt-receiving surface of said rotary disc and around a belt-receiving surface provided in said driving means; and c. a solenoid-controlled plunger having a solenoid electrically connected in circuit with said switching means so as to change over said solenoid and plunger under control of said switching means from a first state, wherein said belt is highly tensioned to operatively connect said rotary disc and said driving means, to a second state, wherein said belt is slackened to release the operative connection between said rotary disc and said driving means, and also connected in circuit with said timer switch means so as to change over said solenoid and plunger under control of said timer switch means from said first state to said second state.

5. A slide film projector as claimed in claim 4 wherein said rotary disc is provided with a mark at one part of said disc to impart an information corresponding to the position of said slide film, and wherein said switching means is able to detect said mark of said rotary disc, and, furthermore, is located at a position where it detects said mark when the slide film is set in its projection position, and is so constituted as to cause said solenoid and plunger to change over from said first state to said second state in response to detection of said mark.

6. A slide film projector as claimed in claim 4 wherein said time measuring means includes means for producing a predetermined output signal after the lapse of time set by said setting means and said timer switch means includes a semiconductor switching means for controlling the change-over operation of said solenoid and plunger in response to said output signal of said time-measuring means, said semiconductor switching means being electrically connected to said time-measuring means and to said solenoid so as to cause said solenoid and plunger to change over from said second state to said first state when said output signal is produced by said time measuring means.

7. A slide film projector for use with slide films pre-mounted in slides and pre-placed in a tray and loaded in the projector by means of the tray, both the tray and the slide film mountings being of predetermined dimensions and configuration, said projector comprising in combination:

a. tray guiding means for accepting and guiding a tray which accommodates therein a plurality of slide films in such a manner that said tray is shiftable within said tray guiding means;

b. optical projection means including a slide film projection station therein;

c. means for moving said tray in said guiding means in such a manner that each of said slide films may be projected one by one;

d. means for moving each of said slide films one by one between a position in which it is supported in said tray and said film projection station;

e. a motor for supplying driving power both for said tray moving means and said slide moving means;

f. means for sequentially actuating said tray moving means and said slide moving means, said actuating means being arranged to receive driving force from said motor upon its being operatively connected with said drive motor;

g. means for selectively connecting and disconnecting said motor and said actuating means operatively, having a first state, wherein operative connection between said drive motor and said actuating means is possible, and a second state, wherein said operative connection between them is not possible and including electrical change-over means for producing a change-over from one of said states to the other;

h. a first control switch for changing over said connecting means from said first state to said second state when said slide film is placed in said projection station by said slide film moving means and for setting and maintaining said connecting means in said first state, when said slide film is set in a position other than in said projection station;

i. a timer circuit for controlling the projection time of said slide film, including means for setting a particular projection time for said slide film, and including time-measuring means, responsive to actuation by said first control switch when said control means causes said connecting means to change over from said first state to said second state, and for producing a predetermined output signal after measuring out said projection time;

j. a second control switch responsive to the output signal from said time-measuring means of said timer circuit, for causing said connecting means to change over from said second state to said first state when said predetermined output signal is produced by said time-measuring means, and k. means for resetting said time-measuring means to an initial state thereof when said slide film is shifted from said projection station to said tray, said initial state being a state of readiness for again measuring out said projection time.

8. A slide film projection as claimed in claim 7 wherein said actuating means includes: a rotary disc rotatable by receiving driving force from said motor when operatively connected to said motor for causing, by its rotation, the operation, in alternating sequence in a predetermined cycle, of said tray moving means and said slide film moving means.

9. A slide film projector as claimed in claim 8 wherein said rotary disc includes a mark provided on one part of said rotary disc for providing information corresponding to a position of said slide film, and wherein said first control switch is capable of detecting said mark of said rotary disc, and is located at a position where it detects said mark when said slide film is positioned in said projection station.

10. A slide film projector as claimed in claim 7 wherein said time-measuring means of said timer circuit includes:

a. a resistance circuit for producing varying resistance values to make it possible to set one of several values of film projection time by selecting an amount of resistance of said resistance circuit corresponding to film projection time and putting said amount of resistance into circuit in said time-measuring means;

b. a manually operable third control switch for selecting and putting into use said amount of resistance of said resistance circuit;

c. a capacitor for measuring out said film projection time in accordance with the resistance value selected by said third control switch, said capacitor being electrically connected to said first, second, and third control switches so as to be caused by said first control switch to commence measuring out the film projection time by altering its charge at a rate determined by said amount of resistance of said resistance circuit selected by said third control switch, and to provide said predetermined output signal to said second control switch upon completion of measuring out of the film projection time, said resetting means including a connection between said capacitor and said first control switch for resetting said capacitor into a state of charge wherein it is ready to measure out said film projection time anew after said slide film is shifted from said projection station to said tray.

11. A slide film projector, comprising in combination:

a. a removable tray for supporting a plurality of slide films in readiness;

b. a tray guiding means for accepting said tray and guiding movement thereof in said projector;

c. means for moving said tray in said tray guiding means in such a manner that each of a plurality of slide films accommodated in said tray may be projected one by one;

d. optical projection means including a slide film projection station, a light source and an optical system for for projecting an image of said slide film;

e. means for moving each of said slide films one by one between a position where said slide film is accommodated in said tray and a position where said film is set in said film projection station;

f. a motor for driving both said tray moving means and said slide film moving means, said motor being arranged to run without an interruption between successive movements of said slide film moving means in successively moving slide films supported in said tray;

g. means for actuating said slide film moving means and said tray moving means in a predetermined cycle by receiving driving force from said motor through a connection with said drive motor, said actuating means being provided at one part thereof with a mark for providing information corresponding to a position of said slide film;

h. means for connecting and disconnecting said motor and said actuating means, including means for performing change-over between a first state, wherein the operative connection between said motor and said actuating means is possible, and a second state, wherein operative connection therebetween is not possible;

i. switching means responsive to said positional information of said slide film provided by said mark, said switching means being located at a position wherein said switching means is able to detect said mark when said slide film is set in said film projection station, for causing said connecting and disconnecting means to change over from said first state to said second state when said switching means detects said mark, and for setting and maintaining said connecting and disconnecting means in said first state when said switching means does not detect said mark;

j. a timer switch means including means for setting the projection time for said slide film, for measuring out said film projection time, beginning when said switching means causes said connecting and disconnecting means to change over from said first state to said second state, and for causing said connecting and disconnecting means to change over from said second state to said first state after lapse of said film projection time, and k. means for resetting said timer switch means in response to said switching means when said slide film is shifted by said slide film moving means from a position where it is set in said film projection station to a position where it is accommodated in said tray so that said timer switch means is thereafter ready to measure out said film projection time anew.

12. A slide film projector, comprising in combination:

a. a removable tray for supporting a plurality of slide films in readiness;

b. a tray guiding means for accepting said tray and guiding movement thereof in said projector;

c. means for moving said tray in said tray guiding means in such a manner that each of a plurality of slide films accommodated in said tray may be projected one by one;

d. optical projection means including a slide film projection station, a light source and an optical system for for projecting an image of said slide film;

e. means for moving each of said slide films one by one back and forth between a position where said slide film is accommodated in said tray and a position where said film is located in said film projection station;

f. a motor for driving both said tray moving means and said slide film moving means, said motor being arranged to run without an interruption between successive movements of said slide film moving means in successively moving slide films supported in said tray;

g. a control disc arranged to rotate when receiving driving force provided by said motor for causing said tray moving means and said slide film moving means to operate in a predetermined cycle, said disc being provided on one part thereof with a mark for providing information corresponding to the position of said slide film with rotation of said disc;

h. means for controllably connecting operatively said motor and said disc;

i. electrically actuatable change-over means arranged to act on said connecting means for performing change-over operation between a first state, wherein said operative connection between said motor and said disc by said connecting means becomes possible, and a second position, wherein said operative connection therebetween becomes impossible;

j. a first switching means responsive to said information provided by said mark and located at a position where it is set in said film projecting station, for causing said change-over means to change from said first state over to said second state when said first switching means detects said mark, and for setting and maintaining said change-over means in said state when said first switching means does not detect said mark;

k. a timer circuit for producing a predetermined signal output at the end of the projection time of said slide film, said timer having means for setting the film projection time for said slide film and being electrically connected to said first switching means in such a way as to be actuated by said switching means to commence measuring out said film projection time when said first switching means causes said change-over means to perform the change-over operation from said first position to said second position;

l. a second switching means responsive to said signal output from said timer circuit for causing said change-over means to perform the change-over operation from said second state to said first state when said predetermined signal output is produced by said timer circuit, and m. means for resetting said timer circuit responsive to said first switching means when said slide film is shifting by said slide film moving means from a position where said slide film is set in said projection station into a position where said slide film is accommodated in said tray for putting said timer circuit into a state wherein it is ready to begin again the measuring out of said film projection time.

13. The slide film projector as claimed in claim 12, wherein said setting means includes:

a. a resistance circuit capable of producing various resistance values to make it possible to set by said setting means any of various film projection times, and b. a third switching means to select a resistance value of said resistance circuit to be put in service, said third switching means being capable of being operated manually from outside of said projector; and wherein said timer circuit includes i. a capacitor for measuring out the film projection time in conformance to the resistance value of said resistance circuit selected by said third switching means, beginning upon operation of said first switching means, and for providing said predetermined signal output to said second switching means upon completion of measuring out the film projection time, and ii. means for resetting said capacitor by said first switching means when said slide film is shifted from said projection station to said tray, and for thereby putting said capacitor back into a state of readiness for beginning a time-measuring operation.

14. The slide film projector as claimed in claim 12, further comprising:

a. a manually operable third switching means provided between said change-over means and said first switching means for making possible selective provision for the use and for the non-use of said first switching means;

b. a fourth switching means responsive to information provided by said mark corresponding to a position of said slide film and located for that purpose at a position where it detects said mark when said slide film has reached a position where said slide film is accommodated in said tray, but connected to be effective only when selectively connected to said change-over means through said third switching means in the state of the latter that puts said first switching means in the state of non-use, for causing said change-over means to perform a change-over operation from said first state when said fourth switching means detects said mark, and for setting and maintaining said changeover means in said first state when said fourth switching means does not detect said mark, and c. means responsive to said fourth switching means for enabling removal of said tray from said guiding means.

15. The slide film projector as claimed in claim 12, further comprising: a manually operable third switching means for setting and maintaining said change-over means in said first state, regardless of said first and second switching means, said third switching means being electrically connected to said change-over means so as to be in a parallel connection with said first and second switching means, so that by use of said third switching means, said tray moving means and said slide film moving means may be caused to operate continuously and alternately at said predetermined cycle regardless of said first and second switching means.

16. A slide film projector as claimed in claim 15 wherein said setting means includes a resistance circuit for providing various resistance values in various settings thereof to make it possible to set various values of film projection time and having a fourth switching means manually operable from outside the projector for setting a value of projection time, and wherein said timer circuit includes a capacitor electrically connected to said resistance circuit through said fourth switching means for settable connection to a resistance value thereof for measuring out the film projection time in conformity to the resistance value of said resistance circuit, beginning in response to said first switching means when said slide film is set in said film projection station, and for providing said predetermined signal output to said second switching means upon completion of measuring out said film projection time, and also includes means for resetting said capacitor when said slide film is shifted from said projection station to said tray, such resetting being into the original state of said capacitor for time measuring, said fourth switching means being connected to disconnect the connection between said capacitor and said resistance circuit when said third switching means is put into a position in which it makes possible the manual control of the projection time without relying on said timer circuit.

17. A slide film projector as claimed in claim 12, wherein said tray moving means is operable in a first operational mode wherein said tray is moved forward in said tray loading station, and in a second operational mode wherein said tray is moved backward, and wherein said slide film projector further comprises:
  a. a mode changing means for changing over the operational mode of said tray moving means between said first operational mode and said second operational mode; and
  b. a manually operable third switching means electrically connected to said mode changing means, for causing operation of said tray moving means in said second operational mode by operation of said third switching means.

18. A slide film projector as claimed in claim 12, wherein said tray moving means is operable in a first operational mode wherein said tray is moved forward in said tray guiding means, and in a second operational mode wherein said tray is moved backward, and wherein said slide film projector further comprises:
  a. a mode changing means for changing over the operational mode of said tray moving means between said first operational mode and said second operational mode; and
  b. a manually operable third switching means which is capable of setting the operational mode of said connected to said change-over means in a manner to be parallelconnected to said first and second switching means for selectively causing said tray moving means and said slide film moving means to be operated alternately in a continuous manner in said predetermined cycle and in said second operational mode, regardless of said first and second switching means.

19. A slide film projector as claimed in claim 18, wherein said slide film projector further comprises a fourth switching means which is manually operable and is electrically connected to said change-over means in parallel with said first and second switching means for enabling, through use of said third switching means, continuous alternate operation of said tray moving means and said slide film moving means in said predetermined cycle in said first operational mode irrespective of said first and second switching means.

20. A slide film projector as claimed in claim 19 wherein said setting means includes: a resistance circuit for providing various settable resistance values to make it possible to set any of various film projection times and having a fifth switching means manually operable from outside the projector for setting a film projection time and wherein said timer circuit includes a capacitor electrically connected to said resistance circuit through said fifth switching means, for measuring out the film projection time in conformance to the set resistance value of said resistance circuit, beginning in response to said first switching means when said slide film is located in said film projection station and for providing said predetermined signal output to said second switching means upon completion of measuring out said film projection time, and also includes means for resetting said capacitor by said first switching means when said slide film is shifted from said projection station to said tray into the initial state of said capacitor for time measuring, said fifth switching means being connected so as to be operable also to disconnect the connection between said capacitor and said resistance circuit, and at the same time to enable, by operation of said fourth switching means, manual control of said projection time without reliance on said timer circuit.

* * * * *